United States Patent [19]

Gahmig

[11] 4,243,717
[45] Jan. 6, 1981

[54] EXPANDABLE POLYSTYRENE WITH STABILIZED CELL STRUCTURE

[75] Inventor: Herbert M. Gahmig, Bad Durkheim, Fed. Rep. of Germany

[73] Assignee: BASF Wyandotte Corporation, Wyandotte, Mich.

[21] Appl. No.: 117,682

[22] Filed: Feb. 1, 1980

Related U.S. Application Data

[63] Continuation of Ser. No. 964,112, Nov. 27, 1978, which is a continuation of Ser. No. 805,377, Jun. 10, 1977, abandoned.

[51] Int. Cl.$^3$ .............................. C08J 9/14; C08J 9/20
[52] U.S. Cl. ............................... 428/402; 260/28.5 A; 521/56; 521/60; 521/98; 521/132; 521/146; 428/403
[58] Field of Search ..................... 521/55, 56, 98, 132; 428/402, 403

[56] References Cited

U.S. PATENT DOCUMENTS

| | | | |
|---|---|---|---|
| 2,979,476 | 4/1961 | Bishop et al. | 260/28.5 A |
| 3,060,138 | 10/1962 | Wright | 260/2.5 B |
| 3,224,984 | 12/1965 | Roper et al. | 260/2.5 B |
| 3,285,865 | 11/1966 | Del Bene et al. | 260/2.5 B |
| 3,320,188 | 5/1967 | Dijkema | 260/2.5 R |
| 3,398,105 | 8/1968 | Roper et al. | 260/2.5 B |
| 3,520,834 | 7/1970 | Mizutani et al. | 260/2.5 B |
| 3,647,723 | 3/1972 | Mysik et al. | 260/2.5 B |

*Primary Examiner*—Morton Foelak
*Attorney, Agent, or Firm*—H. Lawrence Jones

[57] ABSTRACT

Incorporating 500 to 5,000, preferably 2,000 to 4,000 parts per million of Fischer-Tropsch wax of high congealing point into beads of expandable polystyrene made by suspension polymerization yields greater advantages, and conditions (time, temperatures, and recipe) of the polymerization become less critical. The drying or conditioning step before the pre-expansion under particular conditions to generate a suitable cell structure need not be followed, and a step of coating with zinc stearate or the like before the pre-expansion may be omitted. Unexpanded beads are obtained which yield consistent cell structure, independent of conditions of their storage. Beads of higher pentane content can be used, and final articles of lower density may be obtained. The throughput of the pre-expander may be increased, and the beads, after pre-expansion, have good free-flowing (reduced clumping) and mold-filling characteristics. Other things being equal, they can be molded with a shorter cycle time, yet exhibit excellent fusion and other desirable characteristics.

22 Claims, No Drawings

EXPANDABLE POLYSTYRENE WITH STABILIZED CELL STRUCTURE

CROSS-REFERENCE TO RELATED APPLICATIONS

This application is a continuation of U.S. patent application Ser. No. 964,112, filed Nov. 27, 1978, which is a continuation of U.S. patent application Ser. No. 805,377, filed June 10, 1977, now abandoned.

BACKGROUND OF THE INVENTION

1. Field of the Invention

This invention relates to the manufacture of articles of expandable polystyrene and the like, and in particular, it relates to a change in the polymerization recipe by which there are formed beads of expandable vinyl aromatic monomer, e.g., polystyrene, which contains on the order of 5 to 9% of pentane or other blowing agent, and still more particularly, the invention relates to a process for making such beads in which the beads have incorporated in them about 500 to 5000 parts of a Fischer-Tropsch wax of a congealing point between 86° and 110° C.

In other aspects, the invention relates to expandable or expanded thermoplastic-composition products having considerable advantages in respect to various matters, as hereinbelow more fully explained.

2. Description of the Prior Art

Those skilled in the art are familiar with two main practices by which styrene may be polymerized, in a suspension-polymerization process, thereby obtaining beads of polystyrene having a molecular weight on the order of 150,000 to 300,000 and containing on the order of 4 to 8% of pentane as a blowing agent. In one of the known methods, styrene, water, a small proportion of protective colloid, such as polyvinylpyrrolidone, and small but effective proportion of one or more free-radical initiators, such as various peroxides and perbenzoates or the like, singly or in mixtures thereof, are stirred and heated to cause polymerization to take place for beads of desired size. According to another suspension-polymerization procedure, water and styrene are charged to a polymerization kettle, along with an agent such as calcium phosphate, and heated with agitation, an emulsifier being added at a particular stage of the heating to influence the bead size. In either case, pentane or the like is added before, during, or after the polymerization.

The use of additives of various kinds has been proposed, such as the addition of hexabromocyclododecane to inhibit the flammability of the product and to influence its cell structure.

In U.S. Pat. No. 3,647,723, it is taught that styrene should be polymerized in the presence of a wax having a melting point of 70° to 123° C., an acid number of 0 to 45, and a saponification number of from 3 to 150. This is said to reduce the tendency of the beads to stick or clump in the pre-expansion stage in hot water. The process is said to be applicable to suspension polymerization of the kind conducted in the presence of salt, and the patent goes on to teach a further decreasing of the stickiness of the beads by treating the beads with zinc, calcium, or aluminium salt of a fatty acid, such as zinc stearate.

In U.S. Pat. No. 3,320,188, the addition of an ester wax of high melting point, of at least about 10° C. higher than that of the solidification point of the polymer, in an extrusion process of polystyrene or the like, to provide a nucleation effect, is taught.

U.S. Pat. No. 2,979,476 teaches mixing polystyrene with about 1% of microcrystalline or Fischer-Tropsch waxes, to form bulk-polymerized materials which are useful for the manufacture of phonograph records.

U.S. Pat. No. 3,060,138 is limited to making foamable polystyrene particles with the use of isopentane as a blowing agent and the addition of 0.5 to 3% of a paraffinic hydrocarbon having 16 to 46 carbon atoms. According to this patent, the use of isopentane is essential, if a desirably fine-celled product is to be obtained.

U.S. Pat. No. 3,224,984 teaches the addition of 100 to 5,000 parts per million of a polyolefin wax "or similar organic resinous polymeric substance". It teaches that the addition of such material gives a desirably small cell size, such as 80 microns, or about 12 cells per millimeter, implying that this result, which is desirable because it shortens the length of time that it is necessary to keep the articles of expanded polystyrene in the mold and thus in the final molding operation, is brought about by the use of such organic resinous polymeric substance. The preferred material used is a polyolefin, is unlike the Fischer-Tropsch wax used with the present invention, and comprises a mixture of homologous but different molecular species with various $C_1$ to $C_4$ side chains. The patent contains no teaching to the effect that a stable cell structure in expandable polystyrene can be obtained, independent from the internal water content of the beads, the polymerization conditions or recipe, or drying and storage conditions of the expandable polystyrene.

It is well known in the industry that the cell structure of beads, when expanded shortly after the polymerization is completed, may vary sharply from the one obtained after flash drying or after storage at different temperatures and/or humidities. Such variations are further enhanced by using different modifiers, like bromine compounds which influence the flammability properties and may lead to a very heterogeneous, non-reproducible cell structure, even after applying the usual techniques of conditioning the product, i.e., subjecting the beads to the action of dry air. A reproducible, uniform cell structure, however, is a prime prerequisite for obtaining products with consistent properties in processing and application.

The subject of the invention is the production of expandable polystyrene with uniform, reproducible cell structure independent from the polymerization recipe, temperature and processing conditions prior to its use in expansion and molding plus the combination with improved expandability, reduction of clumping, improved wet and dry bead flow, improved fusion, reduced water adsorption, increased hydrophobicity, good mold release and excellent smooth surface, in particular of hot-wire-cut boards made from blocks of expandable polystyrene. The combination of such properties has hitherto not been achieved nor taught in the above cited patents.

Thus, in general, it is fair to state that the prior art of which the applicant is aware does not teach or suggest overcoming the various problems indicated above, by the addition of the indicated quantities of Fischer-Tropsch wax.

DESCRIPTION OF THE PREFERRED EMBODIMENTS

Styrene is polymerized in aqueous suspension in accordance with one of the usual practices, i.e., using either calcium phosphate or the like plus an emulsifier, or an organic protective colloid such as polyvinylpyrrolidone, polyvinylacetate or the like with the single exception that in the reaction mixture, there is added an amount such as about 2,000 parts per million of Fischer-Tropsch wax having a congealing point of about 86° to 110° C. In the particular work which I have done, there was used a wax melting at 92° C. and having an average molecular weight of 750.

The consequence of making this change are immense.

First, this makes it possible to use the beads immediately as they come from the reactor in which they are formed because they now possess a stable and uniform cell structure, even when polymerized at widely differing temperatures, using different reaction times and recipes.

Second, this invention yields beads having a stable and uniform cell structure which eliminates the need for a special conditioning or drying process that would otherwise be required in order to obtain a product with defined, reproducible properties.

Third, these beads do expand readily to a density such as 16 grams per liter or less, without any shrivelling or subsequent density increase, and this makes such a bead product eminently suitable for the molding of blocks designed for thermal insulation purposes.

Fourth it is noticeable that the beads have a much lower tendency to form clumps during the pre-expansion operation, to the extent that the customary pretreatment of beads to be expanded with zinc stearate or other surface coatings may be omitted.

Fifth, the pre-expanded beads have, in their wet or dry state, good free-flowing characteristics, and despite not having a treatment with zinc stearate or the like, show a markedly improved mold-filling ability. Even molds which usually are difficult to fill, or include portions with thin walls, can readily be filled with beads made according to the present invention.

Sixth, because of the extremely stable cell structure which in turn produces a very stable pre-expanded bead and its good filling properties, it becomes possible to mold successfully such beads after a storage time which is shorter than usual. This increases the output of given facilities.

Seventh, the beads may also be stored over extended periods of time, like during weekends or during plant shutdowns, without losing their ability to produce very well-fused articles, since there are no substances on the bead surface which may interfere with the fusion of the pre-expanded bead during the final expansion step in a closed mold, as practiced in industry.

Eighth, because of the excellent fusion and the hydrophobic surface of the bead, there is a markedly reduced absorption of water during the cooling process in the mold in the final molding operation.

Ninth, molded articles have excellent mold-release properties, even without the use of mold-release agents, which in turn may interfere with the flammability characteristics of articles molded from special modified grades of expandable polystyrene. This makes it possible to reduce also the time required for cooling the mold, because no mold sticking occurs at higher mold temperatures either, thus reducing the need for cooling water and producing a still drier article.

Tenth, the use of the invention makes it possible to produce final products, in particular blocks, having a lower density, because the amount of pentane or other blowing agent which is added to the beads before, during, or after the polymerization reaction may be permitted to be somewhat greater than before. This makes it possible to achieve densities of 13 grams per liter at more economical expansion rates than have hitherto been possible.

Eleventh, the invention increases the speed of hot-wire cutting of blocks significantly and produces boards with an extremely smooth surface.

Twelfth, the addition of the wax does not in any way adversely affect the results of flammability tests of the kind hitherto used in the industry, and it is very important that this be the case.

In summary, the invention provides an answer to practically all of the problems which have been faced by users of expandable polystyrene beads, whether for the making of blocks of insulation or for the production of shaped pieces.

The invention is considered applicable to polystyrene and other vinylaromatic polymers of similar nature, such as poly-alphamethylstyrene, or to copolymers which result from the free-radical copolymerization of such monomers with relatively minor amounts of olefinic comonomers such as acrylonitrile. The term "expandable polystyrene" will be understood in a generic sense as covering all such polymers. Those skilled in the art will perceive the possibility that the teachings of the invention may also be applicable to the manufacture of other expandable or foamable thermoplastic polymers.

The invention has been tried with n-pentane as the blowing agent used, but there is no reason to believe that it would not, in a proper case, operate in substantially the same way if a different blowing agent, such as petroleum ether, isopentane, hexane, one of the lower fluorocarbons, etc., or compatible mixtures thereof were used instead.

The invention has been tried particularly with the use of a Fischer-Tropsch wax having a congealing point of 92 degrees Centigrade and an average molecular weight of about 750. Such a wax is commercially available from Moore and Munger, Inc., of Stamford, Connecticut, U.S.A., under the designation "Paraflint H1-N3" and is further characterized as a polymethylene Fischer-Tropsch wax of the family of paraffinic hydrocarbons of the formula $C_nH_{2n+2}$, where "n" has an average value of 52 to 56. It is in the form of a micronized powder with a maximum particle size of 10 microns. It will be evident to those skilled in the art that similar Fischer-Tropsch waxes can be expected to perform in the same manner, i.e., ones having a congealing point of approximately 86 to 110 degrees Centigrade.

The proportion of wax used may be varied, within limits. At rates of less than 500 parts per million by weight, based upon the quantity of styrene used, there is little or no effect, and within a range of the lower rates of use, up to about 1500 or 2000 parts per million, there is an increasing effect, with a noticeable decrease in the cell size as the amount of Fischer-Tropsch wax used is increased. At about 2000 to 4000 or 5000 parts per million, there is rather little difference, but the higher values do yield a modest improvement. It is believed that at beyond about 5000 parts per million, there is no additional benefit obtained, though the use of proportions as great as 10,000 parts per million may conceivably be practiced. The cost of the addition of such relatively modest amounts is relatively very low, and the advantages which are obtained, as explained above, are certainly so great that the overall costs of the process are considerably reduced when the present invention is practiced.

It does not matter whether the Fischer-Tropsch wax is incorporated by being put into the pentane or other blowing agent, into the styrene (in which it is not soluble at room temperature but quite soluble enough at a moderately increased temperature such as 55 degrees Centigrade), or in the form of a suspension in the water, though introduction with the pentane is probably the most convenient.

It does not matter too importantly when the pentane is introduced into the system whereby the expandable polystyrene is made; practices for introducing pentane or other blowing agent in which the pentane is added last are known and used, but these are usually to be avoided if the beads of expandable polystyrene which are being made are relatively large, such as 5 millimeters in diameter, because of the added time required for the diffusion of the pentane into the beads, if they have already been formed. In other words, it is usually more advantageous to add the pentane or the like before or during the polymerization.

As has been indicated above, it is possible with the use of the present invention to use slightly greater proportion of pentane, i.e., 5 to 9 weight percent, based upon the styrene, in contrast to the usual range of 5 to 8 percent. More pentane is used if a lower-density final product is desired. Previously the use of greater proportions of pentane than 8 percent was avoided because of the greater tendency of the beads to give off pentane during storage between when the formation of the beads and the pre-expansion step. Moreover, the use of such greater amounts of pentane would necessarily be associated with attempts to obtain low density such as 8 grams per liter, but such attempts were usually not successful, at least when it was tried to perform a pre-expansion in a single step, because of the relatively lower throughputs of the pre-expansion equipment and process under the conditions known prior to the present invention.

Those skilled in the art already know the practices and equipment and recipes used for making expandable polystyrene beads of a given size by suspension polymerization, and to a great extent, these remain unchanged, with the possible exception indicated above.

It has been customary in the industry to subject the beads removed from the polymerization kettle to a drying or conditioning step, by draining the beads and subjecting them to the action of dry air. Usually, when the beads have not been so conditioned, there have quite often been obtained certain undesirable effects, such as the development of an undesirably coarse cell structure (2 or only 1 cell per millimeter) in at least a portion of the bed as expanded. Such coarse cell structure is associated with other difficulties later on in the processing, such as a need to take more time for the pre-expansion and the final molding steps, and until the present invention, it occurred sporadically, even with the best of the known practices for preventing it. An advance such as the present invention, which permits the user to obtain reliably a finer cell structures, such as 8 to 12 cells per millimeter, is important to the art.

It has also been usual, after the conditioning step, to subject the expandable polystyrene beads to coating with a material such as zinc stearate, calcium stearate, or some other equivalent material, usually one in the nature of a water-insoluble metal salt of fatty acid, as a measure chiefly intended to prevent clumping of the beads during the operation of the pre-expander. It is usually in this as-coated form that the expandable polystyrene beads are shipped to the customer, who at his plant site performs the necessary further steps required to obtain a finished product. These include at least a first pre-expansion, followed usually by either a molding into a shaped article, or a final expansion into a large block (which may then be cut into smaller slabs or pieces of desired shape), or inclusion in a lightweight aggregate, etc.

It is here appropriate to observe that the invention may be considered, in an article-of-manufacture aspect, as comprising the expandable polystyrene beads of the applicant, which are characterized by the features of being 0.1 to 5 millimeters in diameter, containing an effective amount of a blowing agent, and in particular, in containing 500 to 10,000 parts by weight, based on the weight of the styrene, of a Fischer-Tropsch wax having a congealing point of 86 to 110 degrees Centigrade. Such a product may be obtained by some other method, such as an extrusion process, yet have for practical purposes all the advantages in respect to the matters which are of importance to a user of the beads, as those skilled in the art will appreciate.

Coming now to a discussion of the pre-expansion operation, it is known how such an operation can be controlled to yield pre-expanded particles of desired size. Relevant considerations, such as feed rate of unexpanded beads, change in the size of the effective volume of the pre-expander, and control of the temperature of the steam used, are discussed in, for example, U.S. Pat. No. 3,973,884. It is evident that the invention operates to improve the throughput, because of the finer-cell structure within the beads. There is less clumping and better flow of the moist beads as they leave the steam-heated pre-expander. The pre-expanded beads have good handling characteristics and do not tend to lose their usefulness if they are stored for some time, such as over a weekend, before being given a final expansion or molding.

The importance of the invention is further made clear by reference to the following Examples, which are to be taken as illustrative and not in a limiting sense. Unless otherwise indicated, parts are by weight, and parts per million are based upon the amount of styrene used.

EXAMPLE 1

Expandable polystyrene was produced from a solution of 0.12 parts benzoyl peroxide and 0.26 parts tertiarybutyl perbenzoate, 8 parts pentane, 0.2 parts of Fischer-Tropsch wax having a congealing point of 92 degrees Centigrade in 100 parts styrene which had been suspended, using vigorous stirring, in 100 parts of water to which 1 part of polyvinylpyrrolidone had been added. Polymerization was effected by heating such suspension to 80 degrees Centigrade, raising the temperature over a five-hour period to 120 degrees Centigrade and then reacting for five more hours at that temperature.

Beads so made were given an expansion test by being subjected to steam at 100 degrees Centigrade for 2 minutes. Expanded beads with a uniform cell structure, 8 to 10 cells per millimeter, were obtained. There were no shrivelled beads.

EXAMPLES 2 AND 3

Example 1 was repeated, with a maximum temperature of 110 degrees Centigrade (Example 2) and 130 degrees Centigrade (Example 3) used in the polymerization. The results were the same.

EXAMPLE 4

Example 1 was repeated, except that up to 15 parts of polystyrene was dissolved in the styrene monomer. The results were the same.

Comparison Test A

Example 1 was repeated, but without the Fischer-Tropsch wax.

In the expansion test, the cell structure was coarse (one to two cells per millimeter) and 50 percent of the beads were shrivelled.

EXAMPLE 5

Example 1 is repeated, except that the styrene monomer also contained 6500 parts per million of hexabromocyclododecane.

When expanded immediately after cooling of the polymerization reactor, the beads give a uniform cell structure of 8 to 12 cells per millimeter in the bead center and a thin shell, about 30 to 100 microns in thickness, of very fine cells (up to 30 cells per millimeter), and the expanded beads do not exhibit any shrivelling.

EXAMPLE 6

Example 5 is repeated, except that instead of being expanded immediately, the beads are subjected to an extended drying in air at temperatures of up to 40 degrees Centigrade and for a time of up to 6 hours.

In the expansion test, the results are that the thickness of the fine-grained outer shell increases to as much as 500 microns and the internal cell structure is further homogenized, to about 10 to 12 cells per millimeter.

Comparison Test B

Example 5 is repeated, but without the addition of the Fischer-Tropsch wax.

In the expansion test, very unsatisfactory results are obtained. There is a very coarse and heterogeneous cell structure (one to five cells per millimeter) and extreme shrivelling.

Comparison Test C

Example 5 is repeated, but without the addition of the Fischer-Tropsch wax, and with extended drying of the beads in air at temperatures of up to 40 degrees Centigrade for up to six hours. This amounts to Test B, but with the extended drying step added between the polymerization and the expansion.

In the expansion test, the results are variable. Though much of the time, there is little shrivelling and a uniform cell structure is obtained, there are times that, for no known reason, a uniform cell structure is not obtained at all.

Water-Effect Test

Beads according to Example 1 and beads according to Comparison Test A were stored in a disiccator over phosphorus pentoxide until an internal water content of less than 0.03 percent was obtained in each case, and expansion tests were conducted upon the beads, both before and after such desiccation. The beads of the invention (Example 1) were the same in each case. The beads of the prior art (Test A) performed quite differently, giving different cell structure, depending on the internal moisture content.

Pre-Expander Tests

A conventional Rodman-type expander having a capacity of 0.22 cubic meters was used to expand beads to a density of 15 grams per liter. Beads according to the invention (Example 1) could be expanded at a rate of 120 kilograms per hour, whereas beads according to the prior art (no Fischer-Tropsch wax, extended drying before the pre-expansion) could be expanded only at the rate of 70 kilograms per hour.

In further testing with such a Rodman-type expander, beads were screened to produce a fraction having particle sizes ranging from 1.0 to 0.4 millimeters, and then expanded to 16 to 18 grams per liter density. Beads according to the invention, containing the Fischer-Tropsch wax, gave only one twentieth as much clumping in the expansion as did beads made in accordance with the prior art.

In further testing, beads of the invention that were made according to Example 5 (containing hexabromocyclododecane and the wax) were expanded, and no additional coating of the beads had been done between the polymerization and the pre-expansion. The pre-expansion proceeded smoothly. This is in sharp contrast to the usual behavior of beads containing the bromine compound, which are known in particular for their tendency to give poor bead flow, both within and from the Rodman expander, unless special coating techniques are also practiced.

Hot-Wire Cutting Tests

A block made of expandable styrene produced according to this invention was compared with one made according to the prior art. Though the prior-art block required 90 to 100 seconds for the hot-wire cut made through it, the block made from material according to this invention was able to have an equal cut made through it in 65 seconds, and when the surfaces produced by the cuts were compared, that through the material of the invention was the better one, being much smoother than the cut through the material of the prior art.

EXAMPLE 7

An aqueous suspension of calcium phosphate is prepared by dissolving 10.9 parts of trisodium phosphate and 0.7 parts of sodium acetate in 950 parts of water, then adding a solution of 16.7 parts of calcium chloride in 50 parts of water. To this mixture, there is added a solution of 1.11 parts benzoyl peroxide and 1.91 parts of t-butyl perbenzoate and 1.21 parts of a micronized Fischer-Tropsch wax having a congealing point of 92 degrees Centigrade in 607 parts of styrene. The mixture is polymerized with vigorous agitation for 6 hours at 80 degrees Centigrade then 0.018 parts of $C_{12}$ to $C_{18}$ sodium alkylsulfonate are added, and the temperature is increased to 90 degrees Centigrade and maintained there for an additional 5 hours. Seven hours after the start of the polymerization at 80 degrees Centigrade, there are added 75 parts of n-pentane. After a total of 11 hours of reaction time, the temperature is raised for 5 hours to 100 degrees Centigrade, and finally, for an additional 5 hours, to 120 degrees Centigrade. The reaction vessel to then cooled to room temperature and the beads are recovered.

In a subsequent expansion test, beads with a uniform cell structure of 8 to 10 cells per millimeter are obtained. The same results are obtained if the Fischer-Tropsch wax is added to the reaction mixture by being dispersed in the aqueous phase.

Comparison Test D

Example 7 is repeated, except that the wax is omitted.

In the expansion test, beads having a coarse and heterogeneous cell structure (about 2 to 5 cells per millimeter are obtained.

EXAMPLE 8

When a polystyrene containing 8 to 10 parts of pentane or other suitable blowing agent is extruded into a bath of cold water and a micronized Fischer-Tropsch wax having a congealing point of 92 degrees Centigrade is continuously added at a rate of 2000 to 5000 parts per million to the granules or beads used as feedstock for such an extrusion operation, and the strands resulting from such an extrusion are cut into cylindrical granules, and these granules are thereafter expanded, the resulting foam exhibit a coarse, heterogeneous cell structure of 1 to 3 cells per millimeter. Subsequent heating of such granules in an aqueous suspension which contains a suitable protective colloid made by reaction of styrene with polyvinylpyrrolidone (such as the protective colloid used in the suspension polymerization described above in Example 3) in a reactor pressurized with 10 atmospheres of nitrogen, using a temperature of 100 degrees Centigrade for 3 hours and followed by cooling to room temperature, yields essentially spherical particles of identical size. This gives a product which is substantially the equivalent of that of Example 1, i.e., a bead of expandable polystyrene containing an effective amount of a Fischer-Tropsch wax having a congealing point of 86 to 110 degrees Centigrade and an effective amount of a volatile blowing agent, such as pentane or the like. Such a bead product may be further processed in ways known to those skilled in the art.

In an expansion test upon such a bead product, a uniform cell structure of 8 to 10 cells per millimeter is obtained.

Comparison Test E

Example 8 is repeated except that the Fischer-Tropsch wax is omitted.

In the expansion test, a heterogeneous cell structure with 2 to 5 cells per millimeter is obtained.

While I have known and described herein certain embodiments of my invention, I intend to cover as well any change or modification therein which may be made without departing from its spirit and scope.

The embodiments of the invention in which an exclusive privilege or property is claimed are defined as follows:

1. Beads of expandable polystyrene having a diameter of about 0.1 to 5 millimeters and containing 500 to 10,000 parts per million by weight based upon styrene of a Fischer-Tropsch wax having a congealing point of 86° to 110° C. and an amount of n-pentane as a blowing agent effective to permit said beads to be expanded in a first step to a density of 10 to 250 grams per liter, said n-pentane being present in a proportion of 5 to 9 weight percent.

2. Beads as defined in claim 1, wherein said pentane is present in a proportion of over 8 and up to 9 weight percent.

3. In a method of making an expandable polystyrene in bead form by suspension polymerization in which styrene monomer is mixed with water and subjected to polymerization conditions and n-pentane as a blowing agent is incorporated in said beads in an amount effective to permit said beads to be expanded in a first step to a density of 10 to 250 grams per liter, the improvement which consists in incorporating within said beads a Fischer-Tropsch wax having a congealing point of 85° to 110° C. in an amount of 500 to 10,000 parts per million by weight, based upon the amount of styrene initially present.

4. An improvement as defined in claim 3, wherein said wax is used in an amount of about 1500 to 5000 parts per million by weight, based upon the amount of styrene initially present.

5. An improvement as defined in claim 3, wherein said incorporating is done by adding said wax with and in said blowing agent.

6. An improvement as defined in claim 3, wherein said incorporating is done by adding said wax in the form of a suspension in styrene.

7. An improvement as defined in claim 3, wherein said incorporating is done by adding said wax in the form of a suspension in said water.

8. A process for making expanded particles of expandable polystyrene having a density of 10 to 250 grams per liter, said process comprising the steps of conducting a suspension polymerization in which styrene monomer is mixed with water and subjected to polymerization conditions and n-pentane is incorporated in beads produced by such suspension polymerization, a Fischer-Tropsch wax having a congealing point of 86° to 110° C. being incorporated in said beads during said polymerization in an amount of 1500 to 5000 parts per million by weight based upon the weight of said styrene monomer, to yield raw beads, and then subjecting said raw beads to the action of steam to cause them to expand to a density of 10 to 250 grams per liter.

9. Beads of expandable polystyrene having a diameter of about 0.1 millimeter to 5 millimeters and containing 500 parts per million to 10,000 parts per million by weight based upon styrene of a Fischer-Tropsch wax having a congealing point of 86° C. to 110° C. and an amount of a blowing agent effective to permit said beads to be expanded in a first step to a density of 10 grams per liter to 250 grams per liter.

10. Beads as defined in claim 9, wherein said blowing agent is one selected from the group consisting of n-pentane, petroleum ether, isopentane, hexane, lower fluorocarbon, and mixtures thereof.

11. In a method of making an expandable polystyrene in bead form by suspension polymerization in which styrene monomer is mixed with water and subjected to polymerization conditions and a blowing agent is incorporated in said beads in an amount effective to permit said beads to be expanded in a first step to a density of 10 grams per liter to 250 grams per liter, the improvement which consists in incorporating within said beads a Fischer-Tropsch wax having a congealing point of 85° C. to 110° C. in an amount of 500 parts per million to 10,000 parts per million by weight, based upon the amount of styrene initially present.

12. An improvement as defined in claim 11, wherein said wax is used in an amount of about 1500 parts per million to 5000 parts per million by weight, based upon the amount of styrene initially present.

13. An improvement as defined in claim 11, wherein said incorporating is done by adding said wax with and in said blowing agent.

14. An improvement as defined in claim 11, wherein said incorporating is done by adding said wax in the form of a suspension in styrene.

15. An improvement as defined in claim 11, wherein said incorporating is done by adding said wax in the form of a suspension in said water.

16. In the method of claim 11, wherein said blowing agent is one selected from the group consisting of n-pentane, petroleum ether, isopentane, hexane, lower fluorocarbon, and mixtures thereof.

17. An improvement as defined in claim 16, wherein said wax is used in an amount of about 1500 parts per million to 5000 parts per million by weight, based upon the amount of styrene initially present.

18. An improvement as defined in claim 16, wherein said incorporating is done by adding said wax with and in said blowing agent.

19. An improvement as defined in claim 16, wherein said incorporating is done by adding said wax in the form of a suspension in styrene.

20. An improvement as defined in claim 16, wherein said incorporating is done by adding said wax in the form of a suspension in said water 21. A process for making expanded particles of expandable polystyrene having a density of 10 grams per liter to 250 grams per liter, said process comprising the steps of conducting a suspension polymerization in which styrene monomer is mixed with water and subjected to polymerization conditions and a blowing agent is incorporated in beads produced by such suspension polymerization, a Fischer-Tropsch wax having a congealing point of 86° C. to 110° C. being incorporated in said beads during said polymerization in an amount of 1500 parts per million to 5000 parts per million by weight based upon the weight of said styrene monomer, to yield raw beads, and then subjecting said raw beads to the action of steam to cause them to expand to a density of 10 grams per liter to 250 grams per liter.

22. The process of claim 21 wherein said blowing agent is one selected from the group consisting of n-pentane, petroleum ether, isopentane, hexane, lower fluorocarbon, and mixtures thereof.

* * * * *